United States Patent [19]

Pfaendner

[11] Patent Number: 5,162,454
[45] Date of Patent: Nov. 10, 1992

[54] POLYAMIDE-POLYIMIDE BLOCK COPOLYMERS

[75] Inventor: Rudolf Pfaendner, Rimbach/Odenwald, Fed. Rep. of Germany

[73] Assignee: Ciba-Geigy Corporation, Ardsley, N.Y.

[21] Appl. No.: 789,382

[22] Filed: Nov. 6, 1991

Related U.S. Application Data

[63] Continuation of Ser. No. 281,150, Dec. 7, 1988, abandoned.

[30] Foreign Application Priority Data

Dec. 15, 1987 [CH] Switzerland .......................... 4880/87

[51] Int. Cl.$^5$ ............................................. C08L 79/08
[52] U.S. Cl. ........................................ 525/432; 525/436
[58] Field of Search ............................... 525/432, 436

[56] References Cited

U.S. PATENT DOCUMENTS

| | | | |
|---|---|---|---|
| 3,894,114 | 7/1975 | Lohmann et al. | 525/432 |
| 4,332,929 | 6/1982 | Holub et al. | 528/185 |
| 4,503,285 | 3/1985 | Darms et al. | 174/68.5 |
| 4,504,632 | 3/1985 | Holub et al. | 525/432 |
| 4,588,804 | 5/1986 | Fryd | 528/125 |

FOREIGN PATENT DOCUMENTS 0154729  9/1983  Japan .................................... 525/432

OTHER PUBLICATIONS

Encyclopedia of Polymer Science and Technology, vol. 11, pp. 264 & 265.

Primary Examiner—Ana L. Carrillo
Attorney, Agent, or Firm—William A. Teoli, Jr.

[57] ABSTRACT

Polyamide-polyimide block copolymers having an average molecular weight $\overline{M}_n$ of 1,000–50,000 and containing recurring units of the formula I $$-\!\!\!\!-\!\!(PA)\text{-}(PI)\!\!-\!\!\!\!- \qquad (I)$$

in which (PA) is a polyamide block having an average molecular weight $\overline{M}_n$ of 300–20,000 and containing at least one (recurring) unit of the formula II

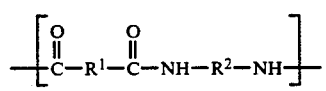

in which $R^1$ is

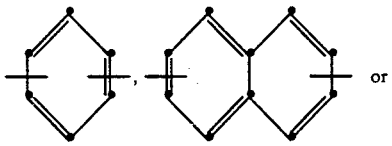

and $R^2$ is

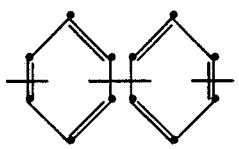

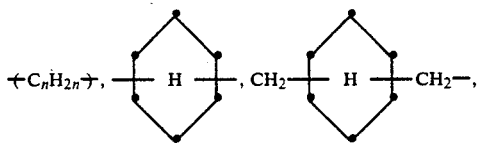

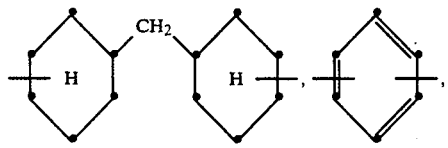

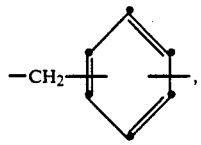

in which Q is a direct bond, $-CH_2-$, $-CH_2CH_2-$,

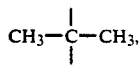

—O—, —S—, —SO$_2$— or —C(O)—, and n is 2–12, and $Y_a$, $Y_b$, $Y_c$ and $Y_d$ independently of one another are hydrogen, halogen or C$_1$–C$_4$alkyl, and (PI) is a polyimide block having an average molecular weight $\overline{M}_n$ of 300–20,000 and containing at least one (recurring) unit of the formula III

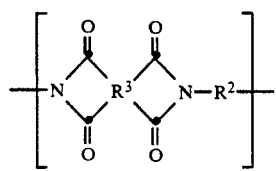 (III)

in which R$^3$ is

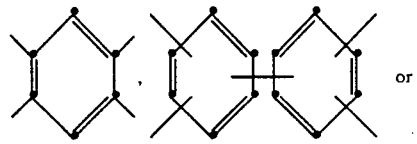 or

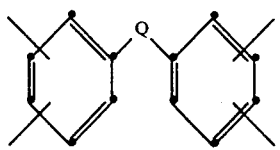

and Q and R$^2$ are as defined above, with the proviso that 25–100 mol % of all the bridge members R$^2$ are

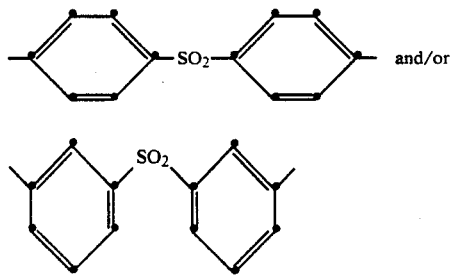

and the (cyclo)aliphatic proportion of bridge members R$^2$ does not make up more than 10 mol %.

These polymers are soluble in aprotic dipolar solvents, which leads to various advantages for practical applications, for example in the production of laminates or coating agents.

10 Claims, No Drawings

POLYAMIDE-POLYIMIDE BLOCK COPOLYMERS

This application is a continuation of application Ser. No. 281,150, filed Dec. 7, 1988, abandoned.

The present invention relates to novel polyamide-polyimide block copolymers.

Polyamide-polyimide block copolymers are known. Because of their good electrical, thermal and/or mechanical properties, these are suitable, for example, as matrix resins, inter alia for the preparation of laminated materials, as coating resins in the electrical and electronics industry, as flexible laminating resins, for example for printed circuits, as adhesive films or as compression moulding compositions. Customary polyamide-polyimide block copolymers are insoluble or only slightly soluble in organic solvents, in this context see, for example, U.S. Pat. No. 3,894,114 or U.S. Pat. No. 4,503,285. To utilize the good properties of polyamide-polyimide block polymers, the readily soluble precursors, the polyamide-polyamide acid block copolymers, must be used as starting substances. The desired end products are obtained by imidation. However, this procedure is unsatisfactory in some respects. On the one hand, the soluble precursors have only a limited storage stability, since the amount of water formed by cyclization leads to a degradation in the molecular weight and/or the cyclization leads to a precipitation of the polymers. In addition, if the imidation is not carried out until processing, for example to films, coatings or shaped articles, the product formed can have defects, such as holes and/or bubbles, because of the water emerging.

There was therefore the need to discover polyamide-polyimide block copolymers which do not have these disadvantages. A soluble polyamide-polyimide block copolymer would not have the deficiencies described. It has now been found, surprisingly, that polyamide-polyimide block copolymers are readily soluble in aprotic dipolar solvents if they contain bridge members derived from diaminodiphenyl sulfone in the polyamide blocks and/or the polyimide blocks. This knowledge is unexpected to the expert, since it is known, for example, that polyimides which are derived from benzophenonetetracarboxylic acid dianhydride and diaminodiphenyl sulfone are insoluble (see, for example, U.S. Pat. No. 4,588,804).

The present invention relates to polyamide-polyimide block polymers having an average molecular weight $\overline{M}_n$ of 1,000–50,000 and containing recurring units of the formula I $$-[(PA)-(PI)]-\quad\text{(I)}$$

in which (PA) is a polyamide block having an average molecular weight $\overline{M}_n$ of 300–20,000 and containing at least one (recurring) unit of the formula (II)

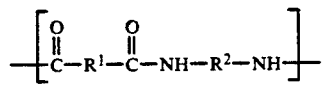

(II)

in which $R^1$ is

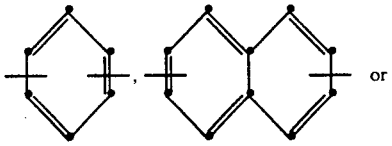

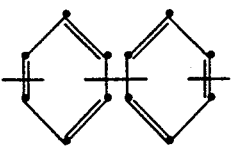

and $R^2$ is

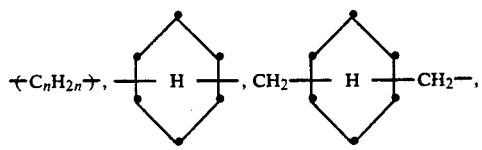

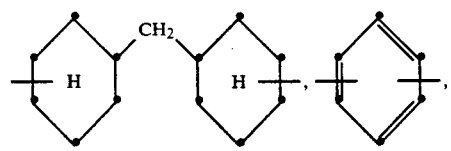

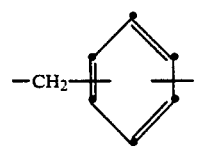

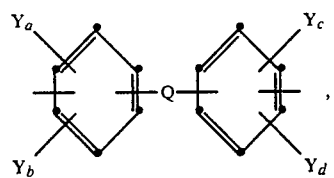

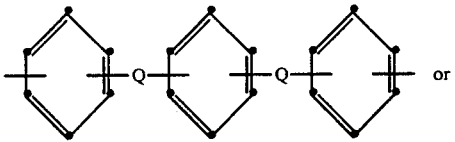

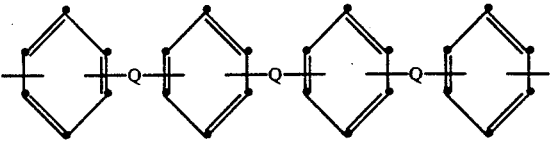

in which Q is a direct bond, $-CH_2-$, $-CH_2CH_2-$,

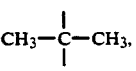

$-O-$, $-S-$, $-SO_2-$ or $-C(O)-$, and n is 2–12, and $Y_a$, $Y_b$, $Y_c$ and $Y_d$ independently of one another are hydrogen, halogen or $C_1$-$C_4$alkyl, and (PI) is a polyimide block having an average molecular weight $\overline{M}_n$ of 300–20,000 and containing at least one (recurring) unit of the formula III

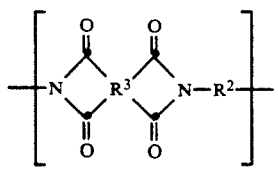

(III)

in which $R^3$ is

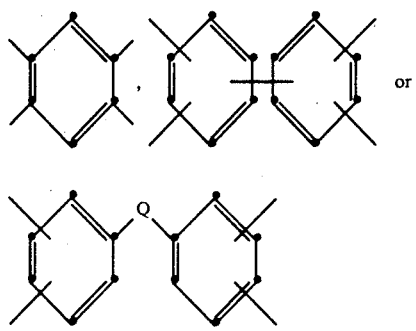

or and Q and $R^2$ are as defined above, with the proviso that 25–100 mol % of all the bridge members $R^2$ are

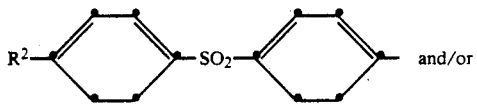

and/or

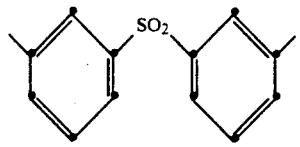

and the (cyclo)aliphatic proportion of bridge members $R^2$ does not make up more than 10 mol %.

Preferred compounds of the formula I have an average molecular weight $\overline{M}_n$ of 4,000–40,000.

In preferred compounds of the formula I, the polyamide blocks and/or the polyimide blocks contain more than one recurring structural unit of the formula II or of the formula III. For preferred polyamide blocks or polyimide blocks, this gives an average molecular weight of 500–20,000.

In the above formulae, $R^1$ is, for example, 1,2-phenylene; 1,3-phenylene; 1,4-phenylene; 1,5-naphthylene; 1,8-naphthylene; 2,3-naphthylene; 3,3'-biphenylene or 4,4'-biphenylene. 1,3-Phenylene is preferred.

According to the invention, $R^2$ in the formulae II and/or III is groups of the formulae

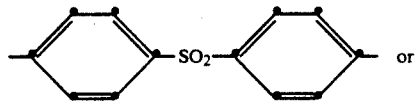

or

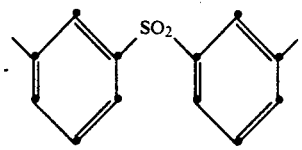

in 25–100 mol % and in particular 50–100 mol % of the bridge members occurring in the copolymer of the formula I. It is not compulsory here for both the polyamide and the polyimide blocks to contain such bridge members.

A group

$R^2$ is, for example, 1,2-ethylene; 1,3-propylene; 1,4-tetramethylene; 1,5-pentamethylene; 1,6-hexamethylene; 1,7-heptamethylene; 1,8-octamethylene; 1,9-nonamethylene; 1,10-decamethylene; 1,12-dodecamethylene; 2,9-decamethylene or 2-methyl-1,5-pentamethylene.

A group

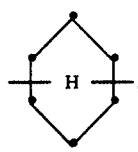

$R^2$ can be 1,2-cyclohexylene; 1,3-cyclohexylene or 1,4-cyclohexylene.

Other examples of specific aliphatic groups $R^2$ are

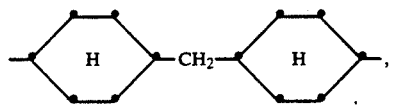

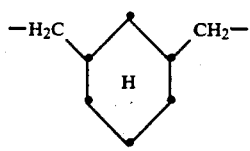

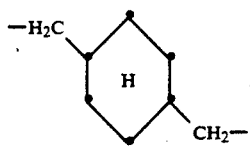

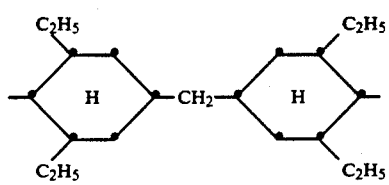

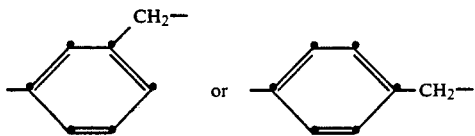
Examples of specific aromatic groups R² are 1,2-phenylene; 1,3-phenylene; 1,4-phenylene; 2,4-methylphenylene; 1,3,5-trimethyl-2,5-phenylene; 2,5-xylylene; 4-chloro-1,3-phenylene; 2,5-dichloro-1,4-phenylene; or one of the following groups
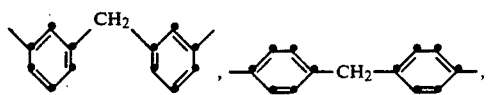
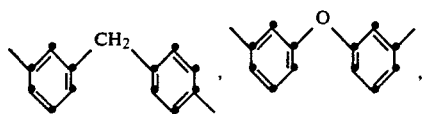
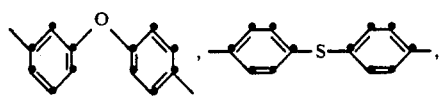
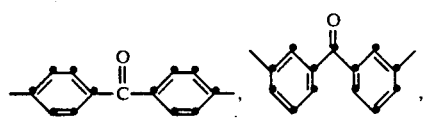
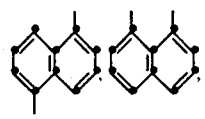
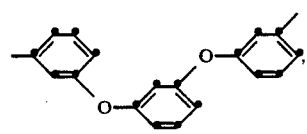
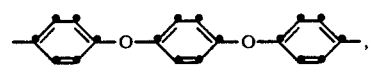
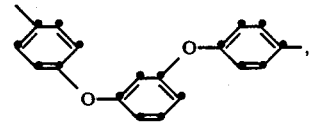
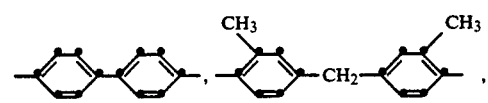
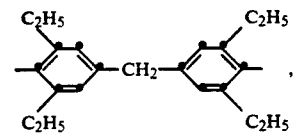
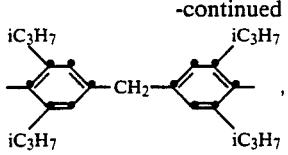
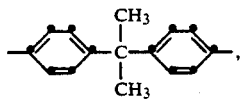
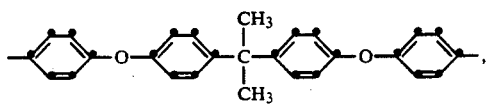
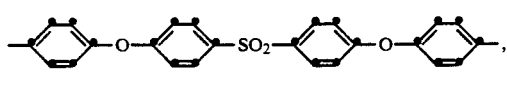
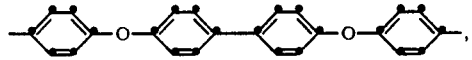
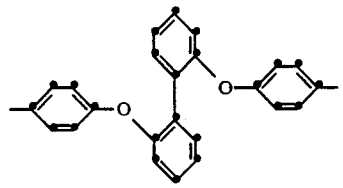
and in particular the groups
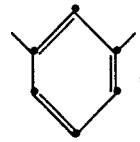
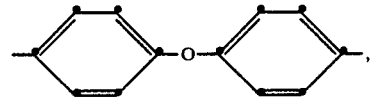
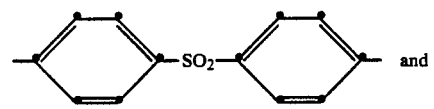 and
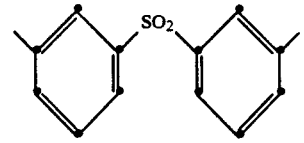
for R² in formula II,
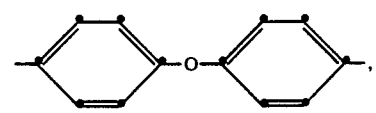

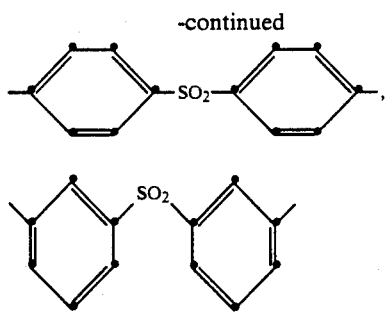

for R² in formula III.

It has been found that compounds with a high aromatic content are particularly suitable. Polyamide-polyimide block copolymers in which the aliphatic or cycloaliphatic proportion in R² makes up not more than 5 mol % are therefore preferred. Particularly preferred compounds have only aromatic groups as R², for example those listed above by way of example.

If the bridge members R² contain a divalent radical Q, this radical is, for example, —CH₂CH₂— or —S—, or preferably —CH₂—,

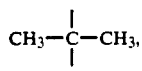

—O—, —SO₂— or —C(O)—. If a bridge member R² contains several radicals Q, these can be identical or different.

The tetravalent radical R³ is derived from a tetracarboxylic acid which is capable of forming a dianhydride. Possible groups are, for example,

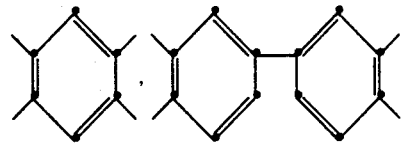

and in particular

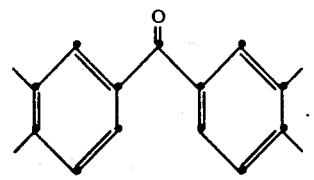

The compounds of the formula (I) are prepared in a manner which is known per se, for example by reacting polyamide acids of the formula IV

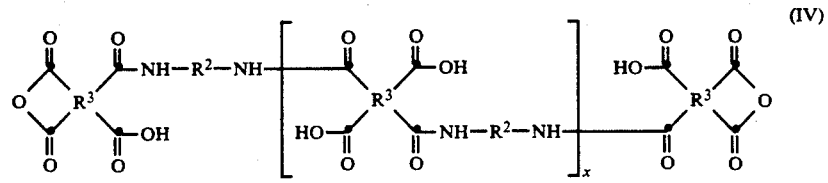

with diamines of the formula V

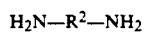

$$H_2N-R^2-NH_2 \qquad (V)$$

and with dicarboxylic acid dichlorides of the formula VI

and then cyclizing the polyamide-polyamide acid copolymers thus obtained. In formulae IV, V and VI, the symbols R¹, R² and R³ are as defined above and x is ≧0, preferably ≧1.

The preparation of the polyamide acids of the formula IV is also known and is carried out, for example, by reaction of tetracarboxylic acid dianhydrides of the formula VII

in which R³ is as defined, with less than the equimolar amount of a diamine of the formula V. It is trivial here and the expert is familiar with how he can establish the average molecular weights defined above (and therefore x) for the individual blocks by suitable reaction conditions, for example by suitable choice of the molar ratios of the reactants. The polycondensation of the di- or tetracarboxylic acid derivatives of the formulae VI and VII with the diamines of the formula V can be carried out in a manner which is known per se, preferably in an anhydrous organic solvent with exclusion of moisture, for example under nitrogen, at temperatures between about −20° C. and +50° C., in particular about −15° C. and +10° C. Suitable organic solvents are: N,N-dimethylacetamide, N,N-diethylacetamide, N,N-dimethylformamide, N,N-dimethylmethoxyacetamide, N-methyl-2-pyrrolidone, N-acetyl-2-pyrrolidone, N-methyl-δ-caprolactam, N,N,N',N'-tetramethylurea, tetrahydrothiophene dioxide (sulfolane) and dimethyl sulfoxide.

The reaction can also be carried out in mixtures of such solvents. On the other hand, it is also possible to dilute these preferred solvent systems with other organic aprotic solvents, such as aromatic, cycloaliphatic or aliphatic, optionally chlorinated hydrocarbons, for example benzene, toluene, xylenes, cyclohexane, pentane, hexane, petroleum ether, methylene chloride, tetrahydrofuran, cyclohexanone and dioxane.

The polyamide blocks can also be prepared by means of interface polycondensation.

When the reaction has ended, the solvents can be removed, if desired, in the customary manner, for example by distillation, if appropriate under reduced pressure. If desired, the polyamide-polyamide acid block copolymers can be precipitated by known methods by pouring the reaction solution into a precipitating agent, such as water or aliphatic hydrocarbons, for example petroleum ether, but in particular methanol, isopropanol, acetone, diethyl ether, bilateral ethers of mono-, di- or triethylene glycols or acetonitrile and the like, and if appropriate dried.

The cyclization of the polyamide-polyamide acid block copolymers to give the corresponding polyamide-polyimide block copolymers is carried out by heating the polyamide-polyamide acid block copolymers, preferably without prior isolation, that is to say directly in the reaction solution described above, to temperatures between 50° and 300° C. or treating them with a dehydrating agent by itself or as a mixture with a tertiary amine. Possible agents are, for example, acetic anhydride and propionic anhydride or a mixture of acetic anhydride and propionic anhydride or pyridine. Process of this type are described, for example, in U.S. Pat. No. 3,894,114; U.S. Pat. No. 4,124,651 or U.S. Pat. No. 4,503,285.

However, the compounds of the formula (I) can also be prepared, for example, by first synthesizing the polyamide block in a manner which is known per se and then preparing the polyamide acid-polyamide block copolymer by reaction with a tetracarboxylic acid dianhydride and a diamine followed by cyclization.

It is also possible first to prepare the polyamide acid block and the polyamide block separately and then to react them with one another subsequently to cyclize the product.

The polyamide-polyimide block copolymers according to the invention have a solubility in aprotic dipolar solvents which is good for the above-mentioned objective. Very good solubilities can be observed, for example, in N-methylpyrrolidone, dimethylacetamide, dimethyl sulfoxide, dimethylformamide, sulfolane and butyrolactone and the like, if necessary with heating. It should be mentioned that a high concentration of the polymeric compounds is desirable. In contrast to the polyamide-polyamide acid precursor, the solutions thus prepared are stable on storage. The same of course also applies to the solid itself.

The preparation of solutions which are free from by-products and monomer residues can be achieved in this manner. Processing is extremely simple, since no cyclization step has to be passed through and therefore no elimination of water takes place, which would lead to undesirable effects and damage to the end product. When the polyamide-polyimide block copolymers according to the invention are used, it is merely necessary to remove the solvent, and production of high-quality products with a high heat stability with the possibility of high use temperatures is possible.

The block copolymers according to the definition are distinguished by a good processability and can be used in a technically simple manner which is known per se for the production of industrial products, such as fibres, fibre-reinforced laminated materials, coated articles, castings, laminates, matrix resins, honeycomb core material, lacquers, adhesives, foams, coating compositions, films (foils), compression moulding and sintering powders and compression moulded articles.

For this purpose, customary additives, such as pigments, fillers, electrical conductors, for example carbon black or metal particles, agents for increasing the abrasion resistance, lubricants or reinforcing fibres, for example carbon, boron or glass fibres, can be added to the block copolymers before or after shaping. Foams are obtained, for example, by adding the customary blowing agents and if appropriate fillers to the polymers before working up, or by blowing air, carbon dioxide, nitrogen or the like into the polymer mass or polymer solution. Coated articles containing block copolymers according to the invention can be provided, if appropriate, with covering layers which improve the surface properties, for example layers of phenolic resins, aluminium and the like, and are used, inter alia, in aircraft construction.

Block copolymers according to the definition, preferably in the form of solutions, can also be used as coating compositions and adhesives and the like, if appropriate with the addition of pigments, such as titanium dioxide, customary fillers and foams and the like, for coating and covering widely varying substrates in any desired form, such as films, fibres, non-wovens, wires, grid-like structures, woven fabrics, foams and the like. Suitable substrates which may be mentioned are: metals, such as copper, brass, aluminium, iron and steel; asbestos fibre and glass fibre materials; polymers, such as cellulose materials (cellulose esters or ethers, paper and the like); perfluorocarbon polymers, such as polytetrafluoroethylene; polyolefins, polyesters, polyamides, polyimides, polyurethanes and the like.

Details of practical applications are described, for example, in U.S. Pat. No. 3,894,114 and U.S. Pat. No. 4,503,285.

EXAMPLES 1-12

Polyamide acid block: 07.66 g (0.21 mol) of 3,3',4,4'-benzophenonetetracarboxylic acid dianhydride and 220 g of N-methylpyrrolidone (NMP) are weighed, under nitrogen, into a double-walled reaction vessel (1 l) equipped with an inert gas connection, internal thermometer, dropping funnel and stirrer. The reaction vessel is evacuated and gassed with nitrogen three times. After cooling to −12° C., a suspension results. A solution of 44.69 g (0.18 mol) of 4,4'-diaminodiphenyl sulfone in 220 g of NMP is added via the dropping funnel at −12° C. in the course of 40 minutes. The reaction mixture is then allowed to come to room temperature and is subsequently stirred for about three hours.

Polyamide-polyamide acid block copolymer: After renewed cooling to −10° C., a further 96.84 g (0.39 mol) of 4,4'-diaminodiphenyl sulfone in 480 g of NMP are added dropwise via a dropping funnel in the course of 35 minutes. 73.70 g of isophthaloyl dichloride (0.363 mol) are subsequently added in portions, so that the internal temperature does not exceed 0° C. About 80 minutes are required, the solution becoming increasingly viscous. The solution is slowly brought to room temperature and stirred at room temperature for 1 hour. 54.1 g (0.73 mol) of butylene oxide are then added dropwise at an internal temperature of 20° C. via a dropping funnel in the course of 25 minutes and the mixture is stirred for a further three hours. A solution of a polyamide-polyamide acid block copolymer with an intrinsic viscosity of 0.82 dl/g (0.5% by weight of solid in NMP/25° C.) is obtained in this manner.

Cyclization: The polyamide-polyamide acid block copolymer solution present is then subjected to cyclization to the polyamide-polyimide block copolymer. For this purpose, 85.0 g (0.84 mol) of triethylamine are added via a dropping funnel in the course of about 20 minutes, and 85.76 g (0.84 mol) of acetic anhydride are then added via the dropping funnel. The reaction mixture is stirred at room temperature for a further hour. The intrinsic viscosity (0.5%, NMP, 25° C.) of a polyamide-polyimide block copolymer prepared in this way is 0.80 dl/g. The solution of the polymer can be stored unchanged at 5° C. for 6 months.

A portion of the solution described above is diluted with the same amount of NMP and the solid is precipitated in 10 times the amount of isopropanol and dried in a vacuum drying cabinet. During this, the temperature is increased stepwise to 240° C. in the course of 72 hours and kept at this temperature for a further 8 hours. After this drying process, the polymer is soluble to the extent of 34% in NMP and to a lesser degree in dimethylacetamide, dimethylformamide, dimethyl sulfoxide and butyrolactone. The intrinsic viscosity (0.5%, NMP, 25° C.) of the product is 0.61 dl/g.

The Examples 2-12 shown in the table are prepared in a corresponding manner.

dichloride are added in five portions over a period of 30 minutes. The solution is then stirred at room temperature for three hours.

Polyamide acid-polyamide block copolymer: After renewed cooling to 0° C., a solution of 19.38 g (0.0803 mol) of 4,4'-diaminodiphenyl sulfone in 175 g of N-methylpyrrolidone is added to the polyamide block solution via a dropping funnel. 30.0 g (0.0931 mol) of 3,3',4,4'-benzophenonetetracarboxylic acid dianhydride are then added in portions in the course of about 60 minutes, the solution becoming increasingly viscous. The solution is slowly brought to room temperature and is stirred at room temperature for two hours. Thereafter, 12.4 g (0.1722 mol) of butylene oxide are added at an internal temperature of 20° C. via a dropping funnel in the course of 30 minutes and the mixture is stirred for a further three hours. A solution of a polyamide acid-polyamide block copolymer with an intrinsic viscosity of 0.46 dl/g (0.5% by weight of solid in NMP at 25° C.) is obtained in this manner.

TABLE

Polyamide-polyimide block copolymers which have been prepared analogously to Example 1

| | PI block | | PA block | | Viscosity η int [dl/g] | | Solubility in NMP [% by weight] |
|---|---|---|---|---|---|---|---|
| No. | Tetracarboxylic acid dianhydride | Diamine | Dicarboxylic acid dichloride | Diamine | PA-PAA | PA-PI | |
| 2 | BTDA 0.0920 | mDDS/pDDS 0.0395/0.0395 | IPC 0.1625 | mDDS/pDDS 0.0855/0.0855 mol | 0.57 | 0.63 | 42 |
| 3 | BTDA 0.0726 | pDDS 0.0622 | IPC 0.109 | pDDS 0.1209 mol | 0.51 | 0.46 | 35 |
| 4 | BTDA 0.1440 | pDDS/DDE 0.1111/0.0123 | IPC 0.2507 | pDDS/DDE 0.2401/0.0267 mol | 1.37 | 0.51 | 17 |
| 5 | BTDA 0.0937 | pDDS 0.0854 | IPC 0.1038 | mPDA 0.1109 mol | 0.43 | 0.34 | 40 |
| 6 | BTDA 0.0978 | pDDS 0.0838 | IPC 0.0852 | pDDS 0.0979 mol | 0.60 | 0.73 | 35 |
| 7 | BTDA 0.0822 | pDDS 0.0740 | IPC 0.0253 | pDDS 0.03312 mol | 0.46 | 0.36 | 30 |
| 8 | BTDA 0.1192 | pDDS 0.0894 | IPC 0.3620 | pDDS 0.3876 mol | 0.96 | 0.66 | 35 |
| 9 | BTDA 0.3445 | pDDS 0.2953 | IPC 0.5915 | mDDS 0.640 mol | 0.99 | 0.74 | 20 |
| 10 | BTDA/PMDA 0.1391/0.1398 | pDDS 0.2391 | IPC 0.4803 | pDDS 0.5189 mol | 0.41 | 0.31 | 30 |
| 11 | BTDA 0.1439 | pDDS 0.1241 | IPC 0.2530 | pDDS 0.2674 mol | 0.43 | 0.36 | 35 |
| 12 | BTDA 0.2123 | pDDS 0.0592 mDDS 0.0591 mBAPB 0.0591 | IPC 0.326 | pDDS 0.1811 mol mDDS 0.1181 mol mBAPB 0.1181 mol | 0.86 | 0.69 | 35 |

BTDA: 3,3',4,4'-benzophenonetetracarboxylic acid dianhydride
PMDA: pyromellitic acid dianhydride
pDDS: 4,4'-diaminodiphenyl sulfone
IPC: isophthaloyl dichloride
mDDS: 3,3'-diaminodiphenyl sulfone
DDE: 4,4'-diaminodiphenyl ether
mBAPB: 1,3-bis(3-aminophenoxy)benzene
mPDA: m-phenylenediamine
NMP: N-methylpyrrolidone
Viscosity: 0.5% by weight of polymer in NMP at 25° C.

EXAMPLE 13

Example of the reverse preparation of the block copolymer, that is to say polyamide block before the polyamide acid block.

Polyamide block: 23.25 g (0.0935 mol) of 4,4'-diaminodiphenyl sulfone and 168 g of N-methylpyrrolidone are introduced under nitrogen into a double-walled reaction vessel (1 l) equipped with an inert gas connection, internal thermometer, dropping funnel and stirrer. The resulting solution is cooled to −10° C. and the reaction vessel is evacuated and gassed with nitrogen three times. 16.2 g (0.0798 mol) of solid isophthaloyl Cyclization: The polyamide-polyamide acid block copolymer solution now present is cyclized by addition of a mixture of 38.8 g (0.3830 mol) of triethylamine and 40.3 g (0.3950 mol) of acetic anhydride. The intrinsic viscosity (0.5% of solid, NMP, 25° C.) of the polyimide-polyamide block copolymer is 0.41 dl/g.

A portion of the polimide-polyamide solution described above is diluted with the same amount of NMP and the solid is precipitated in 10 times the amount of isopropanol and dried in a vacuum drying cabinet. During this, the temperature is increased stepwise to 240° C. in the course of 72 hours and is kept at this temperature for eight hours. After this drying process, the polymer is soluble to the extent of more than 15% in NMP. The intrinsic viscosity (0.5%, NMP, 25° C.) of the product is 0.40 dl/g.

EXAMPLE 14

Example of the separate preparation of the two blocks

Polyamide acid block: 41.30 g (0.1282 mol) of 3,3',4,4'-benzophenonetetracarboxylic acid dianhydride and 124 g of NMP are initially introduced into a double-walled reaction vessel (1 1) equipped with an inert gas connection, internal thermometer, dropping funnel and stirrer. The reaction vessel is evacuated and gassed with nitrogen three times. After cooling to −10° C., a suspension results. A solution of 27.37 g (0.110 mol) of 4,4'-diaminodiphenyl sulfone in 103 g of N-methylpyrrolidone is added via the dropping funnel in the course of 60 minutes. Thereafter, the reaction mixture is allowed to come to room temperature and is subsequently stirred for about three hours.

Polyamide block: 33.7 g (0.1357 mol) of 4,4'-diaminodiphenyl sulfone in 126 g of N-methylpyrrolidone are initially introduced into another double-walled reaction vessel (1 1) equipped with an inert gas connection, internal thermometer, dropping funnel and stirrer. The reaction vessel is evacuated and gassed with nitrogen three times and then cooled to −8° C. 22.31 g (0.11 mol) of isophthaloyl dichloride are then added in five portions in the course of 70 minutes. The solution is slowly brought to room temperature and stirred for three hours. 12.0 g (0.167 mol) of butylene oxide are now added via the dropping funnel in the course of 15 minutes and the mixture is then stirred at room temperature for a further 30 minutes.

Polyamide-polyamide acid block: The polyamide solution is allowed to run into the polyamide acid solution at a temperature between 0° and 10° C., under an inert gas and with vigorous stirring. The reaction vessel is then flushed with 100 g of N-methylpyrrolidone and the mixture is stirred at 10° C. for one hour. A further 5.9 g (0.0818 mol) of butylene oxide are added via a dropping funnel and the mixture is stirred at room temperature for about one hour.

A solution of a polyamide-polyamide acid block copolymer having an intrinsic viscosity of 0.21 dl/g (0.5% by weight of solid in NMP at 25° C.) is obtained in this manner.

Cyclization: The polyamide-polyamide acid block copolymer solution now present is cyclized by addition of a mixture of 68.61 g (0.6780 mol) of triethylamine and 75.22 g (0.7368 mol) of acetic anhydride. The intrinsic viscosity (0.5% of solid, NMP, 25° C.) of the polyimide-polyamide block copolymer is 0.24 dl/g.

A portion of the polyimide-polyamide solution described above is diluted with the same amount of NMP and the solid is precipitated in 10 times the amount of isopropanol and dried in a vacuum drying cabinet. The temperature is increased stepwise to 240° C. in the course of 72 hours and the mixture is kept at this temperature for eight hours. After this drying process, the polymer is soluble to the extent of 20% in NMP. The intrinsic viscosity (0.5%, NMP, 25° C.) of the product is 0.23 dl/g.

What is claimed is:

1. An aprotic dipolar solvent soluble polyamide-polyimide block copolymer having an average molecular weight $\overline{M}_n$ of 1,000–50,000 and containing recurring units of the formula I

in which (PA) is a polyamide block having an average molecular weight $\overline{M}_n$ of 300–20,000 and containing at least one recurring unit of the formula II

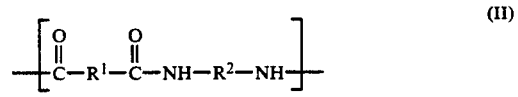

in which $R^1$ is

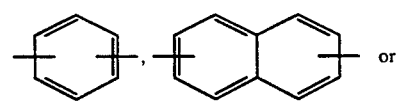

and $R^2$ is

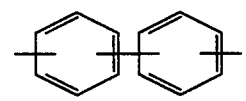

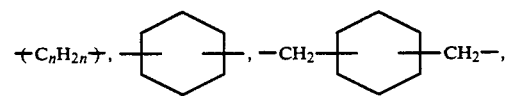

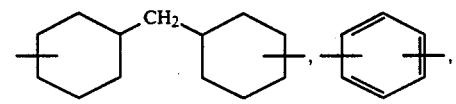

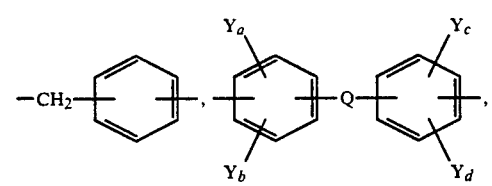

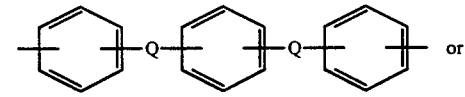

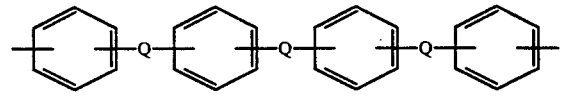

in which Q is a direct bond, —CH$_2$—, —CH$_2$CH$_2$,

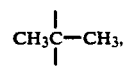

—O—, —S—, —SO$_2$— or —C(O)—, and n is 2–12, and $Y_a$, $Y_b$, $Y_c$ and $Y_d$ independently of one another are hydrogen, halogen or $C_1$–$C_4$ alkyl, and (PI) is a polyimide block having an average molecular weight $\overline{M}_n$ of 300–20,000 and containing at least one recurring unit of the formula III

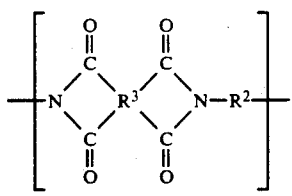

in which $R^3$ is

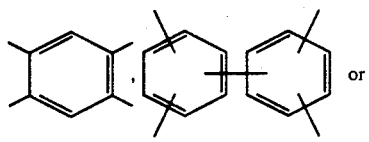 or

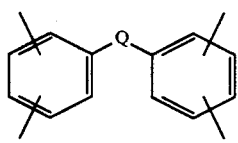

and Q and $R^2$ are defined above, with the proviso that 25–100 mol % of all bridge members $R^2$ in the copolymer of formula I are

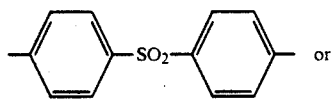 or

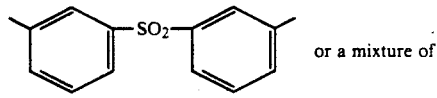 or a mixture of

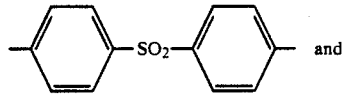 and

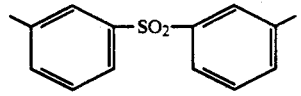

and at most 10 mol % of all bridge members $R^2$ in the copolymer of formula I are (cyclo)aliphatic.

2. A block copolymer according to claim 1, in which, in the formula II, $R^1$ is

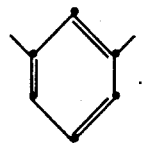

3. A block copolymer according to claim 1, in which, in the formulae II, formula III or formula II and III $R^2$ is

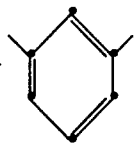,

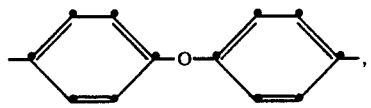,

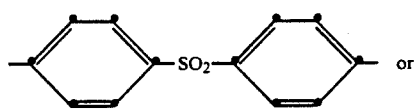 or

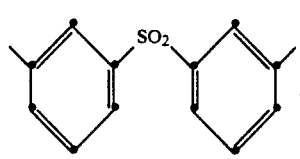

4. A block copolymer according to claim 1, in which, in the formula III, $R^3$ is

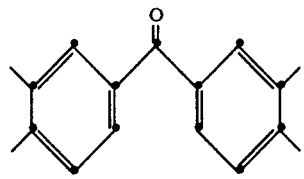

5. A block copolymer according to claim 3, in which, in the formula III, $R^2$ is

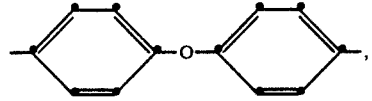,

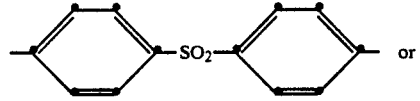 or

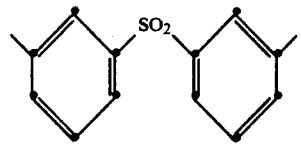

6. A block copolymer according to claim 1, in which 50–100 mol % of all the bridge members $R^2$ are

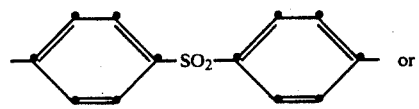 or

-continued

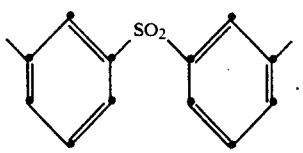

7. A block copolymer according to claim 1, in which the (cyclo)aliphatic proportion of bridge members $R^2$ makes up not more than 5 mol %.

8. A block copolymer according to claim 1, in which all the bridge members $R^2$ are aromatic.

9. A block copolymer according to claim 1, in which the bridge members $R^2$ in formula II are

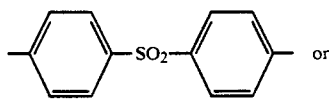 or

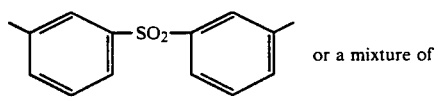 or a mixture of

-continued

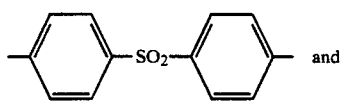 and

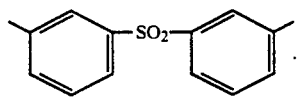.

10. A block copolymer according to claim 1, in which the bridge members $R^2$ in formula III are

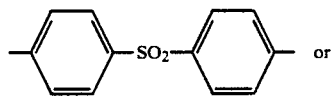 or

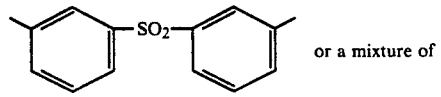 or a mixture of

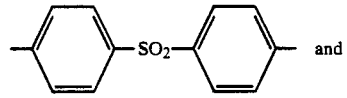 and

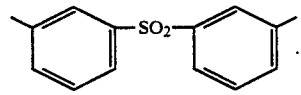.

* * * * *